US005109611A

United States Patent [19]

Houck

[11] Patent Number: 5,109,611

[45] Date of Patent: May 5, 1992

[54] PICTURE POSITION MARKING TOOL

[75] Inventor: Ronald B. Houck, Marion, N.C.

[73] Assignee: Avtech, Inc., Marion, N.C.

[21] Appl. No.: 707,341

[22] Filed: May 29, 1991

[51] Int. Cl.[5] .................... G01B 3/02

[52] U.S. Cl. .................... 33/613; 33/666

[58] Field of Search .................. 33/613, 666; 248/547, 248/544

[56] References Cited

U.S. PATENT DOCUMENTS

| | | | |
|---|---|---|---|
| 3,516,165 | 6/1970 | Pfeffer | 33/520 X |
| 4,382,337 | 5/1983 | Bendick | 33/613 X |
| 4,455,756 | 6/1984 | Greene | 33/613 |
| 4,473,957 | 10/1984 | Faulkner | 33/666 |

*Primary Examiner*—Harry N. Haroian

*Attorney, Agent, or Firm*—Mason, Fenwick & Lawrence

[57] ABSTRACT

A picture position marking tool comprises an arm having an element for marking a position on a wall, as by penetration of the wall. The arm supports a picture either by a wire hanger or a strap hanger, so that the hanger is in substantially horizontal alignment with the wall marking element. A protrusion may be provided on the arm, located on the same side as the marking element, and spaced from it. A handle is provided which includes a grip portion which, in a preferred embodiment, is connected to the arm by a connecting portion, the connecting portion being at right angles to both the arm and the grip portion and providing a tool of generally U-shaped configuration. The handle portion may also be, in other embodiments, in other orientations relative to the connecting portion. In still other embodiments, the handle portion may extend directly to the arm, spaced from the marking element and forming an angle with the arm: the angle may be either a right angle, or an acute or obtuse angle.

16 Claims, 3 Drawing Sheets

PICTURE POSITION MARKING TOOL

BACKGROUND OF THE INVENTION

The present invention relates to a tool for marking the desired position for placement of a picture hanger on a wall.

It has long been recognized that a tool for assisting in marking of the desired location of a picture hanger on a wall is desirable, and many suggestions have been made for such tools.

Among the tools of this general nature is that disclosed in Pfeffer U.S. Pat. No. 3,516,165, in which a supporting element in the form of a flat wooden ruler is provided at its lower end with a picture hanger on one side, and a wall marking element on the other side, in substantially horizontal alignment. The wall marking element is disclosed as being a thumb tack having the head secured, as by gluing, to the wooden stick. In use, a picture is suspended on the hanger by a hanger wire attached to the picture, and the wooden stick, with the picture supported on it, is moved to different locations on the wall until a suitable location is found. The wooden stick is held against the wall with one hand, and the other hand pushes against the picture, the force being transmitted through the wooden stick to the tack, causing the tack to penetrate into the wall to mark the location. Then a picture hanger or nail is appropriately attached to the wall using the marking of the wall by the penetration of the tack as a reference point.

Bendick U.S. Pat. No. 4,382,337 provides a body having a pin extending from it, the pin having a groove which receives the cord or wire of a picture. A picture is placed so that the picture and frame are on the side of the body opposite the side from which the pin extends, the hanger wire being in the groove of the pin. A hand-held suspension cord supports the body and the picture supported by it. Using the suspension cord, the picture is moved until the desired location is reached, and then the wall is marked by pushing against the picture with the other hand, transmitting the force through the body and into the pin.

Pressing on pictures is not desirable because this action will soil the pictures, such as a glass pane covering the art work, soil the art work such as prints and oil paintings which are not covered with glass. In addition, where the item to be hung is an oil painting or a print and has no strong backing, there is substantial danger that there will be tearing or other damage to it.

Greene U.S. Pat. No. 4,455,756 discloses an elongated metal support having an opening in it between its ends, with a picture hook in the opening supported by a ledge and held by adhesive tape. The support with the picture on it is moved about until the desired location is found. Then, the picture is removed from the support and is put down with the intent that the support be held in place and not be moved. The installer then acquires a hammer which is used to drive the nail of the picture hanger into the wall while holding the support with the other hand. When the elongate support is moved, the adhesive tape is ruptured, thereby releasing the connection between the elongate support and the picture hanger. This construction requires either an assistant to remove the picture and hand the hammer to the installer, or requires the installer to remove the picture from the support after the location is determined, deposit the picture in a manner not to injure it, then secure a hammer and hammer the support, all without moving the support.

SUMMARY OF THE INVENTION

A position marking tool comprises an arm on which is a wall marking element, preferably in the form of a penetrating point, having a groove in its upper surface located adjacent the arm, to receive the hanger wire of a picture. On the side of the arm opposite the marking element is a hook which is configured to engage a strap-type hanger secured to the back of a picture frame and having a portion in spaced relation to the picture frame. Near the upper end of the arm on the same side as the marking element, there is a protrusion. which functions as a fulcrum. The tool includes a handle or grip which is connected to the arm, and is out of alignment with the arm: the handle is grasped in order to support the arm while the picture is supported either by its wire or strap hanger on the arm, and by means of the handle the tool and the picture supported on it are moved to a proper location. Then, the handle is moved to cause the marking element to mark the wall at the desired location: this marking action may be facilitated by the protrusion which serves as a fulcrum.

Further, the handle or grip may be connected to the arm by a connecting portion which is substantially perpendicular to both the handle and to the arm, so that the tool has a general U-shape; alternatively, the handle may extend in the direction opposite to the arm. In another configuration, the connecting portion ma extend perpendicular to the arm. and the handle or grip portion may be at an acute or obtuse angle to the connecting portion. Further, in accordance with the present invention, the handle or grip portion and the arm may have adjoining ends, and being at right angle, or the grip portion may be at an acute or obtuse angle to the arm. In all of these exemplary configurations of a picture position marking tool in accordance with the present invention, the correct position for a nail or similar picture supporting element may be marked on a wall while the picture is supported thereon, and without either touching the picture or removing the picture from the device.

Among the objects of the present invention are the provision of a picture position marking tool which enables the desired position of a picture hanger to be marked on a wall while supporting a picture in the desired position, and with marking achieved without touching, soiling or damaging the picture and without removing the picture from the tool.

Another object of the present invention is to provide a picture position marking tool which is economical to manufacture, and which has no moving or jointed parts.

Still another object of the present invention is to provide a picture position marking tool which may be readily used for the positioning of a picture whether the picture has a wire hanger or a strap hanger.

Still another object of the present invention is the provision of such tool which will accommodate pictures having a substantially large distance between the top of the picture and the top of the hanger wire.

Other objects and many of the attendant advantages of the present invention will be readily understood from the following specification, claims and drawings.

DESCRIPTION OF THE PREFERRED EMBODIMENTS

Figure 1:
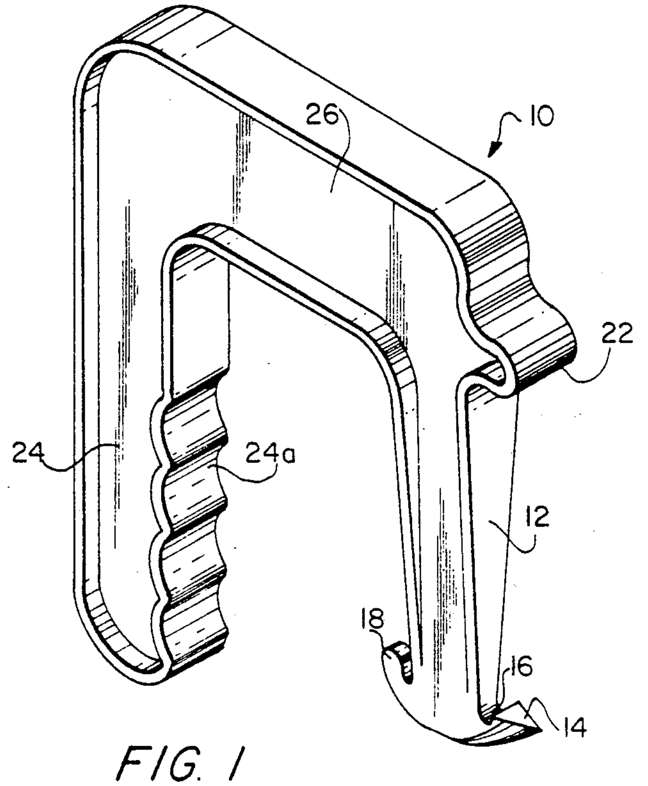
FIG. 1 is a perspective view of a picture position marking tool in accordance with the present invention.

Referring now to the drawings, wherein like or corresponding reference numerals are used for like or corresponding parts throughout the several views, there is shown in FIG. 1 a picture position marking tool 10 in accordance with the present invention. The tool 10 is preferably made by conventional plastic molding operations and is a one piece unitary device.

The picture position marking tool 10 comprises an arm 12 having at the lower end thereof a wall marking element 14 in the form of a sharp protruding point. At the inner end or base of marking element 14 is a groove 16 for receiving a picture hanger wire. The bottom of groove 16 is substantially in alignment with the point of the marking element 14. On the opposite side of the arm 12 from the marking element 14 is a hook 18 which is dimensioned so as to engage a hanger of the strap type, entering at least in part between the hanger and the picture frame.

At the upper end of arm 12 is a protrusion 22, located on the same side of the arm 12 as the marking element 14.

For supporting the arm 12 and a picture supported thereon, there is provided a grip portion 24 and a connecting portion 26. As will be seen, the grip portion 24 and the arm 12 are both substantially perpendicular to the connecting portion 26, and extend in the same direction from the connecting portion 26. Grip portion 24 is preferably provided with finger-receiving indentations 24*a*.

Figure 2:
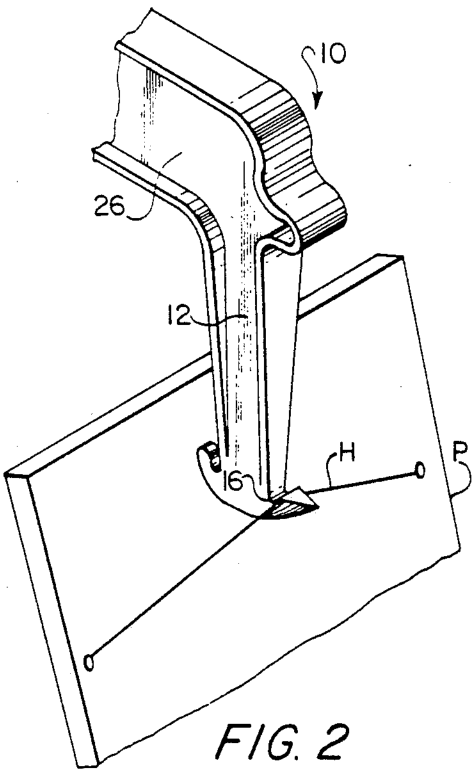
FIG. 2 is a perspective view showing a portion of the picture position marking tool of FIG. 1, supporting a picture by the wire thereof.

In FIG. 2, there is shown a portion of the picture position marking tool 10 in accordance with the present invention, there also being shown the top part of a picture P with a hanger wire H engaged in the groove 16, so that the picture P is thereby supported by the tool 10. As will be seen, the top of the picture P is spaced from the connecting portion 26, due to the fact that the length of the arm 12 is sufficient to accommodate the vertical extent of the picture P above the uppermost part of the hanger wire H.

Figure 3:
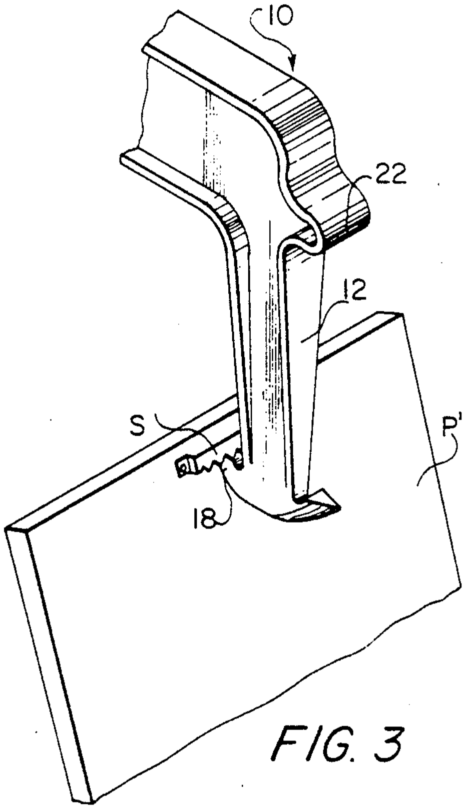
FIG. 3 is a similar view to FIG. 2, the picture having a strap hanger.

In FIG. 3, there is shown a portion of the picture position marking tool 10 supporting a picture P' by a strap hanger S secured thereto. The strap hanger S is of known construction, having two portions in engagement with top of the picture frame, and an intermediate portion spaced from the top of the picture frame. The hook 18 on the arm 12 enters at least partly into the noted space, and thereby the picture P' is supported on the hook 18.

Figure 4:
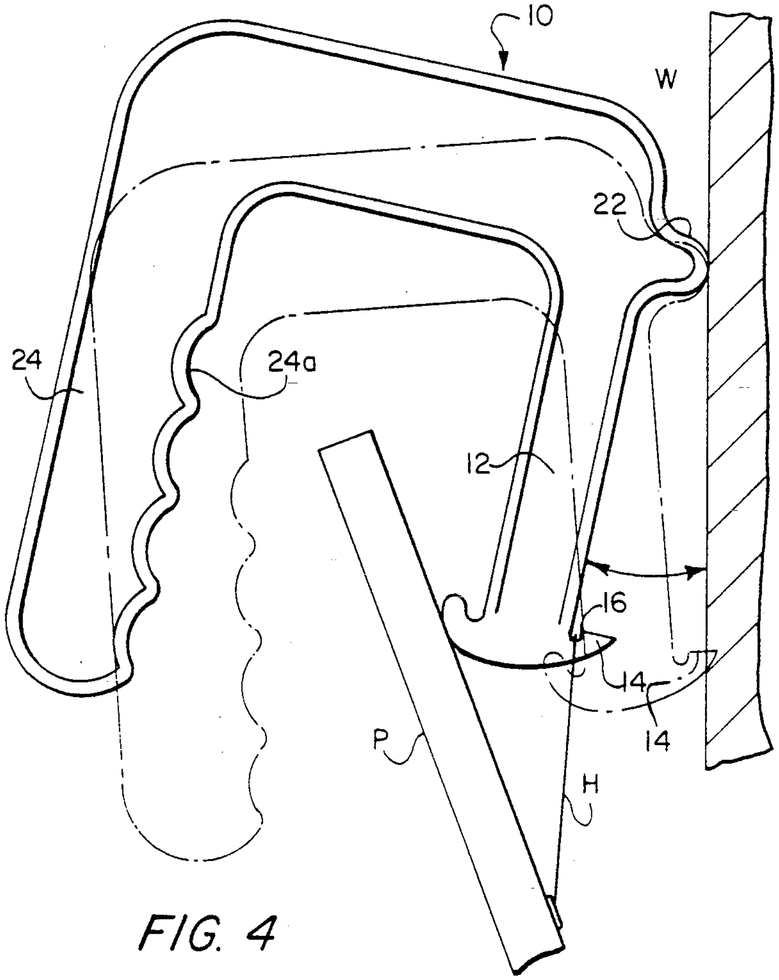
FIG. 4 is a side elevation illustrating the manner of using a picture position marking tool in accordance with the present invention.
Figure 5:
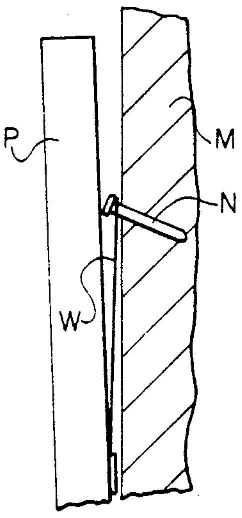
FIG. 5 is an elevational view of a picture mounted on a picture supporting nail.

In FIG. 4, there is shown the manner of use of the generally inverted U-shaped picture position marking tool 10. With the picture P supported thereon by the hanger wire H in the groove 16, the tool 10 and the picture P are moved to various locations on a wall W. When the desired location is reached, the protrusion 22 is caused to engage the wall W, and the tool 10 is rotated to cause the marking element 14 to engage and penetrate the wall W. The force applied to the marking element 14 is transmitted from a hand gripping the grip portion 24 through the structure of the tool 10, without applying force to or engaging the picture P. After the wall W is marked, the installer separates the picture P from the tool 10, and places them both on a suitable support. Then nail N may be driven into the wall W at the mark made by the penetration of element 14, and then the picture P is hung on the nail N by the wire W, as shown in FIG. 5. As will be apparent, other types of picture supports may be secured to the wall, using the penetration mark for placement thereof. The picture hanger is positioned so that the hanger wire H will be supported at a position which holds the picture P at substantially the identical position which was determined to be the desired position when the picture P was supported by the tool 10.

Figure 6:
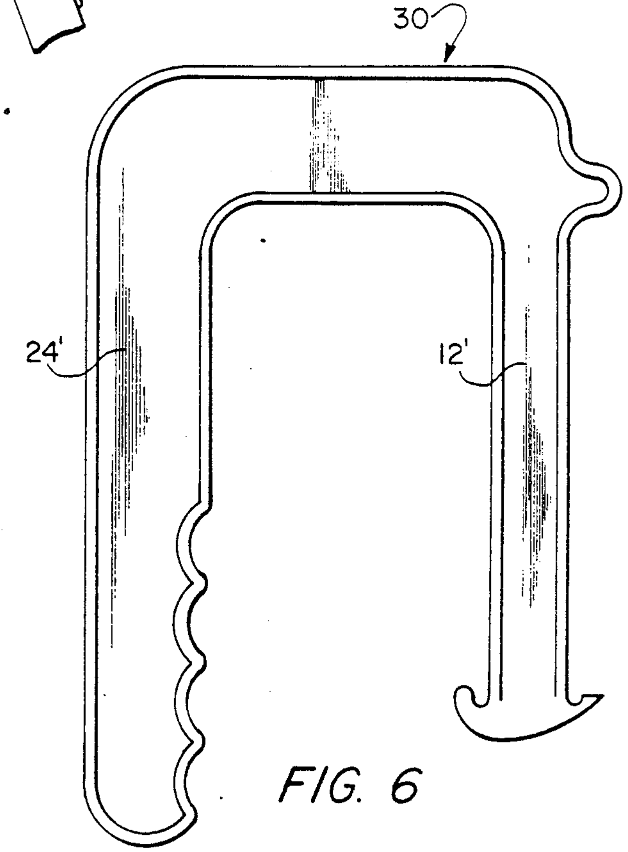
FIG. 6 is an elevational view of an alternate embodiment of the picture position marking tool.

In FIG. 6, there is shown an alternate embodiment of a picture position marking tool 30 in accordance with the present invention. The tool 30 will be seen to have an arm 12' which is of substantially greater length than the arm 12 of the tool 10. Also, as shown in FIG. 6, the grip portion 24' may be substantially longer than the grip portion 24 of the first disclosed embodiment of the tool in accordance with the present invention. The tool 30 may have the arm 12' as long as desirable, to accommodate pictures with larger distances between the picture top and the hanger wire.

Within the scope of the present invention, many different embodiments of a picture position marking tool may be provided which accomplish the goals of the present invention, and examples of such alternate embodiments are shown in FIGS. 7-11. Thus, in FIG. 7, the tool 35 will be seen to have an arm 12, a connecting portion 26 which is at right angles to the arm 12, and a grip portion 24 which is at right angles to the connecting portion 26, but which extends oppositely to the arm 12.

Figure 7:
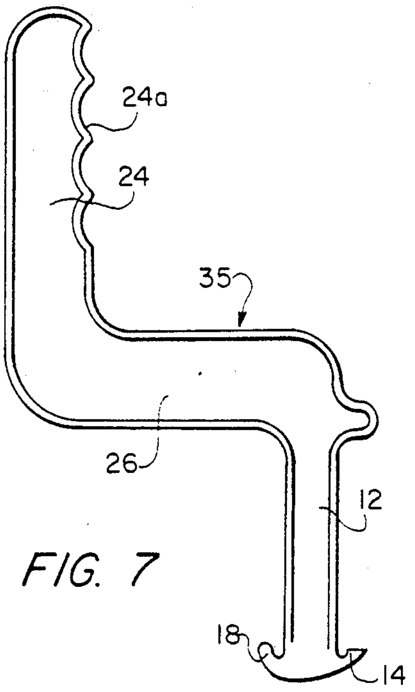
Figure 8:
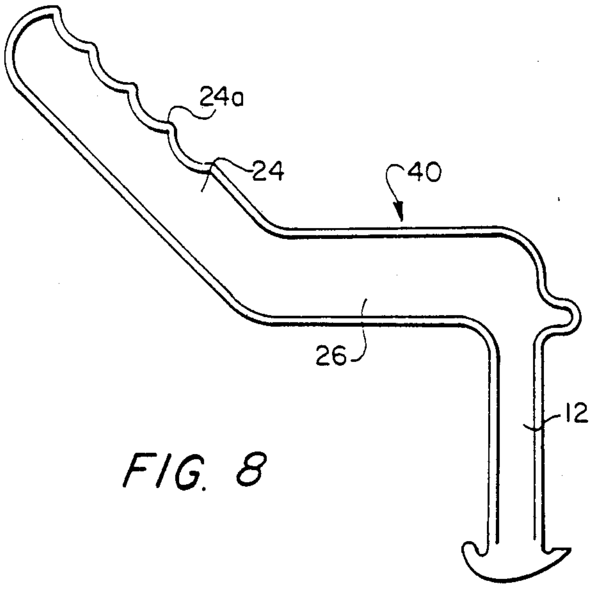

In FIG. 8, the picture position marking tool 40 has an arm 12 and connecting portion 26 at right angles to it, and a grip portion 24 extending at an obtuse angle to the connecting portion 26. In the embodiments of FIGS. 7 and 8, the indentations 24*a* are located as shown. As will be understood, grip portion 24 could extend at an acute angle to connection portion 26 in which case the positioning of the finger receiving indentations 26*a* thereof will be in accordance with that shown in FIGS. 1 and 10.

Figure 9:
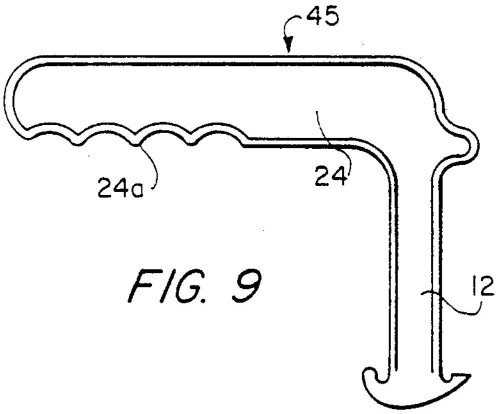
FIGS. 7-11 are elevational views of alternate embodiments of picture position marking tools in accordance with the present invention.
Figure 10:
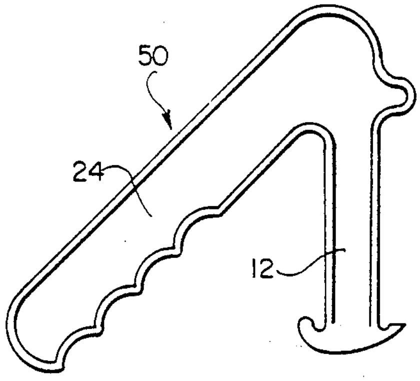
Figure 11:
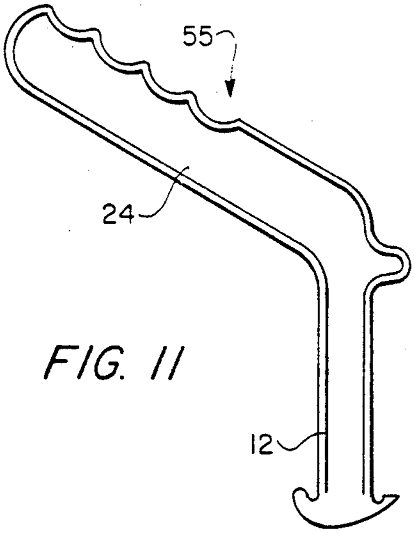

In FIGS. 9-11, there are shown picture position marking tools 45, 50 and 55, in which the grip portion 24 is directly attached to or is integral with the arm 12, with no significant connecting portion. In FIG. 9, the tool 45 extends at right angles to the arm 12, while in FIGS. 10 and 11 the grip portions 24 extend, respectively, at an acute angle and at an obtuse angle to the arm 12.

There have been provided embodiments of picture position marking tools which are capable of supporting a picture having either a hanger wire or a strap hanger, and moving a picture supported on the tool to a desired position, and then marking the desired position on a wall without engaging the picture other than by the support thereof by the tool. Force to cause the marking of the wall by the tool, as by penetrating the wall, or marking on the wall (e.g. pen or pencil), is applied from the hand of the person supporting the tool and picture to and through the tool to the marking element, without applying any force to or engaging the picture. The tool herein provided is of economical construction and is strong, and is easily used.

The claims and specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. A tool for marking the position of a picture support on a wall comprising:

an arm, means on said arm for marking a position on a wall for placement of a picture support, means on said arm for supporting a picture in substantially horizontal alignment with said marking means, handle means connected out of alignment with said arm for supporting said arm and for urging said marking means against a wall while a picture is supported on said tool by said supporting means, and means for providing a fulcrum engageable with the wall for rotation of said tool about said fulcrum means to cause engagement of said marking means with the wall.

2. The tool of claim 1, wherein said fulcrum means comprises a protrusion extending from said arm on the same side thereof as said marking means, and spaced therefrom.

3. A tool for marking the position of a picture support on a wall comprising:

an arm having a wall-engaging portion, means on said arm for marking a position on a wall for placement of a picture support, wherein said marking means is spaced from said wall-engaging portion, means on said arm for supporting a picture in substantially horizontal alignment with said marking means, and handle means connected out of alignment with said arm at a location spaced from said marking means:

(a) for supporting (i) said arm and (ii) a picture supported on said tool by said supporting means and (b) for urging said marking means against a wall while a picture is supported on said tool by said supporting means by rotation of said handle about said wall-engaging portion of said arm and the wall engaged thereby.

4. The tool of claims 1 or 2, wherein said supporting means is on the opposite side of said arm from said marking means.

5. The tool of claim 4, said supporting means comprising means for engaging a strap hanger attached to a picture.

6. The tool of claim 5, and further comprising a groove in said marking means for supporting a picture by a wire hanger attached thereto.

7. The tool of claim 1 or claim 2, wherein said handle means comprises a grip portion, a connecting portion extending from said arm, said grip portion extending from said connecting portion.

8. The tool of claim 7, wherein said grip portion is parallel to said arm and said connecting portion is substantially perpendicular to said grip portion and to said arm.

9. The tool of claim 8, wherein said grip portion and said arm extend in the same direction from said connecting portion.

10. The tool of claim 8, wherein said grip portion extends from said connecting portion in the opposite direction from said arm.

11. The tool of claim 1 or claim 2, wherein said handle means comprises a grip portion having an end at said arm, and a free end spaced from said arm, and being at an angle to said arm.

12. The tool of claim 11, wherein said grip portion is at an angle of 90° to said arm.

13. The tool of claim 11, wherein said grip portion is at an obtuse angle to said arm.

14. The tool of claim 11, wherein said grip portion is at an acute angle to said arm.

15. A tool for marking the position of a picture support on a wall comprising:

an arm having means thereon for marking a position on a wall for placement of a picture support, means on said arm for supporting a picture in substantially horizontal alignment with said marking means, a protrusion on said arm, on the same side as said marking means and spaced therefrom, and handle means connected with said arm for supporting said arm and for urging said marking means against a wall while a picture is supported on said tool by said supporting means.

16. A method of marking the position of a picture support on a wall comprising:

supporting a picture from a supporting tool having a fulcrum, a picture support thereon and a marking element thereon spaced apart from the fulcrum, with the fulcrum against a wall, and with the marking element in proximity to and pointed towards a wall, and causing said marking element to mark the wall at a desired location while said picture is supported on said tool by rotating said tool about the fulcrum and applying force only to said tool to cause said marking element to engage the wall.

* * * * *